3,347,930
PRODUCTION OF DERIVATIVES OF
OMEGA-HYDROXYTIGLALDEHYDE
Herwig Freyschlag, Horst Pommer, and Werner Reif, Ludwigshafen (Rhine), Germany, assignors to Badische Anilin- & Soda-Fabrik Aktiengesellschaft, Ludwigshafen (Rhine), Germany
No Drawing. Filed May 31, 1963, Ser. No. 284,357
Claims priority, application Germany, June 1, 1962,
B 67,508
7 Claims. (Cl. 260—602)

Omega-hydroxytiglaldehyde ethers and esters have great industrial importance because they serve for example as initial materials for the synthesis of vitamin A and its derivatives. Two methods have been described for the production of hydroxytiglaldehyde and one of its derivatives, but both give extremely low yields and require several steps.

We have found that derivatives of omega-hydroxytiglaldehyde (4-hydroxy-2-formylbutene-(2)) are obtained in good yields and in an advantageous way by treating 2-formyl-2-hydroxybutene-(3) or its acetals or acylates with thionyl chloride, thionyl bromide or phosgene in the presence of N,N-alkyl substituted amides of low molecular weight fatty acids or N-alkyl substituted lactams. Mixtures of the said halogenating agents may also be used.

The new process gives very high yields and it is a particularly favorable feature that the derivatives of omega-hydroxytiglaldehyde formed in this way exhibit outstanding purity and are present uniformly or almost uniformly in the trans form.

Examples of N,N-dialkyl substituted low molecular weight fatty acid amides are N,N-dimethylformamide, N,N-diethylformamide, N,N-dimethylacetamide, and N,N-dibutylpropionamide. Examples of N-alkyl pyrrolidones and N-alkyl caprolactams are N-methylpyrrolidone and N-ethylcaprolactam. We also include among the N,N-dialkyl substituted amides, compounds in which the N-alkyl groups are connected to each other direct or, for example, via oxygen. N-formylpiperidine and N-formylmorpholine may be cited as examples of this type of compound.

The N,N-dialkyl substituted fatty acid amides or the N-alkylated lactams or mixtures of such compounds acting as catalysts in the process of this invention may be used at the same time as the reaction medium. It is also possible to use other solvents, for example aliphatic or aromatic hydrocarbons or chlorinated hydrocarbons, such as petroleum ether, ligroin, benzene, toluene or methylene chloride, either alone or together with the N,N-dialkyl substituted amides or N-alkyl substituted lactams used as solvents.

The amounts of solvent used may be varied within wide limits but it is preferred to use the amides or lactams, when they are used together with other solvents, in amounts of about 0.01 mole or more with reference to the 2-formyl-2-hydroxybutene-(3) or its hydrate derivative. By hydrate derivative we mean the acetals and acylates. For example, in mixtures of the amides or lactams with other solvents, it is possible to use one mole of the amide or lactam (with reference to 2-formyl-2-hydroxybutene-(3)) in addition to more or less large amounts of other solvents. It is recommended that a reaction medium as free as possible from water be used, but it is also possible to start from a moist reaction medium.

The process is usually carried out under atmospheric pressure or a slight superatmospheric pressure if phosgene is being passed in. It is also possible to work in pressure vessels under superatmopheric pressure. The other halogenating agents specified are advantageously used in a slight molar excess. One embodiment of the process consists for example in introducing a mixture of 2-formyl-2-hydroxy-butene-(3) or its hydrate derivative and of the amide or lactam into a solvent, for example benzene, and passing in phosgene or allowing thionyl chloride to flow in slowly at room temperature. In another embodiment, a mixture of the amide or lactam with the halogenating agent may be prepared and the said butene derivative or its hydrate derivative then added. The process according to this invention may generally be carried out well in the temperature range of the laboratory or plant. If desired, the reaction may also be carried out at a temperature within the range from —30° C. to +120° C. or even outside this range.

Although the advantages of the new process are evident with all of the said initial substances, lower acetals of 2-formyl-2-hydroxybutene-(3) are preferred, for example the acetals derived from common aliphatic alcohols, i.e., di-lower alkyl acetals. For practical reasons, the dimethyl or diethyl acetals are chosen. As acylates, those are preferred which are derived from common aliphatic acids, the lower fatty acids.

By the process there is formed from 2-formyl-2-hydroxybutene-(3), by rearrangement of the hydroxyl group and its replacement by halogen, a derivative of tiglaldehyde in accordance with the following equation:

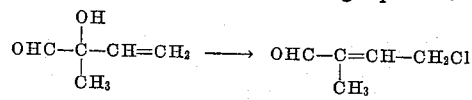

By reason of the high field effect of the formyl group and also its hydrate derivatives, it was not to be foreseen that it would be possible, by allyl displacement, to displace the hydroxyl in alpha-position to the formyl group, while halogenating it, into the omega-position, i.e. to the terminal carbon atom. The result of the process according to this invention is also impressive because it is known that in the reaction of allyl alcohols with for example thionyl chloride in dilute ethereal solution, the isomeric chloride formed by allyl displacement is only the sole reaction product when the concentration of the solution is chosen less than 1-molar. At higher concentrations or also when using solvents other than ether, whose use is of little advantage industrially, mixtures of isomers are formed. When using phosgene as such as the chlorinating agent, a mixture of isomeric allyl chlorides is also always obtained from allyl alcohols.

It was therefore not to be foreseen that by using thionyl chloride, thionyl bromide or phosgene in the presence of N,N-dialkyl substituted amides of low molecular weight fatty acids or N-alkyl substituted lactams in accordance with this invention, a considerable contribution to the art would be made because halogenation of the initial material now proceeds in such a way that the product halogenated in omega-position is obtained practically exclusively.

For the use of the halogenated tiglaldehyde or its acetal or acylate in industrial syntheses, for example for the production of vitamin A, it is remommended that the products obtainable according to this invention should be converted by reaction in conventional manner with metal salts of fatty acids or also with alcoholates into derivatives of the corresponding omega-hydroxy compounds. It is advantageous to choose for this purpose alkali salts of low molecular weight fatty acids having 2 to 18 carbon atoms. Aromatic carboxylic acids may however be used in the same way with good results. Instead of fatty acids, with which ester derivatives of tiglaldehyde or obtained, alcoholates may be used and these give ether derivatives of tiglaldehyde. Alkali salts of low molecular weight alcohols having 1 to 6 carbon atoms are advantageous, but aromatic alcohols including the salts of phenol may be used with equally good results.

2-formyl-2-hydroxybutene-(3) may be obtained according to British patent specification No. 871,804 by partial hydrogenation of 2-formyl-2-hydroxybutyne-(3) and this in turn may be obtained by ethinylation (reaction with acetylene) of methylglyoxal acetal. The latter may be obtained by the process described in German patent specification No. 1,008,276.

The invention is further illustrated by the following examples, in which parts are by weight.

Example 1

262 parts of thionyl chloride is dripped at $-10°$ to $-20°$ C. into 159 parts of dimethylformamide in 860 parts of toluene. Then 292 parts of 1,1-dimethoxy-2-methylbuten-(3)-ol-(2) is dripped in and the whole stirred for another two hours at room temperature. 1000 parts of water is then added and the whole stirred for another four hours. The organic layer is separated, the solvent evaporated under subatmospheric pressure and the residue rectified. 170 parts of 4-chloro-2-formylbutene-(2) is obtained having the boiling point (0.5 mm. Hg) of 41° to 43° C.; $n_D^{20}=1.4863$.

Example 2

155 parts of phosgene is dissolved in 670 parts of benzene while cooling. A mixture of 195 parts of 1,1-dimethoxy-2-methylbuten-(3)-ol-(2) and 110 parts of dimethylformamide is then dripped in at $+5°$ to $+10°$ C. The whole is stirred for one hour at room temperature. The reaction mixture is made neutral with about 105 parts of a 30% solution of sodium methylate in methyl alcohol and then poured into ice-water. After the organic phase has been separated and the solvent evaporated in vacuo, the residue is rectified. 178 parts of 4-chloro-2-dimethoxymethylbutene-(2) is obtained having the boiling point (1.0 mm. Hg) of 43° C.; $n_D^{20}=1.4512$.

Example 3

A solution of 263 parts of dimethyl formamide in 860 parts of toluene is prepared and while stirring vigorously 360 parts of phosgene is passed in in such a way that the temperature does not rise above $+5°$ C. Then 438 parts of 1,1-dimethoxy-2-methylbuten-(3)-ol-(2) is dripped in at $+15°$ to $+20°$ C. The whole is then stirred for another three hours at room temperature, 1000 parts of water is added to the reaction mixture and the lower aqueous layer is separated off. The organic phase is stirred with 500 parts of 5% aqueous sulfuric acid for five hours. The toluene solution remaining after removal of the lower aqueous phase contains 280 parts of 4-chloro-2-formylbutene-(2) (determined by infrared spectroscopy) which may be further reacted direct without purification in this solution or after the solvent has been evaporated under subatmospheric pressure.

Example 4

131 parts of dimethyl formamide is dripped into a solution of 180 parts of phosgene in 660 parts of methylene chloride at 0° C. Then while stirring vigorously, 220 parts of 1,1-dimethoxy-2-methylbuten-(3)-ol-(2) is dripped in so that the temperature does not rise above $+25°$ C. The whole is stirred for another three hours, 400 parts of water is added and the aqueous phase is separated. The organic phase is stirred for five hours with 400 parts of 5% aqueous sulfuric acid. After the aqueous layer has been separated and the solvent has been evaporated, 140 parts of crude 4-chloro-2-formylbutene-(2) is obtained which may be further reacted without purification.

Example 5

240 parts of phosgene is dripped into a solution of 272 parts of N-formylpiperidine in 860 parts of toluene at 0° C. Then 292 parts of 1,1-dimethoxy-2-methylbuten-(3)-ol-(2) is dripped in in such a way that the temperature does not rise above $+25°$ C. The whole is stirred for another three hours, the reaction mixture made neutral by dripping in a 30% solution of sodium methylate in methanol (about 165 parts) and then ice-water is added. The toluene solution contains 220 parts of 4-chloro-2-dimethoxymethylbutene-(2) (determined by infrared spectroscopy) which may be further reacted without purification either in this solution or after evaporation of the solvent under subatmospheric pressure.

Example 6

The same result is obtained as in Example 5 when the 272 parts of N-formylpiperidine is replaced by 276 parts of N-formylmorpholine.

We claim:

1. A process for the production of derivatives of omega-hydroxytiglaldehyde wherein a member selected from the group consisting of 2-formyl-2-hydroxybutene-(3), di-lower alkyl acetals thereof and lower fatty acid acylates thereof is halogenated with a halogenation agent selected from the group consisting of thionyl chloride, thionyl bromide and phosgene in the presence of a member selected from the group consisting of N,N-dialkyl substituted amides of low molecular weight fatty acids, pyrrolidones and N-alkyl caprolactams.

2. A process as claimed in claim 1, wherein the dimethyl acetal of 2-formyl-2-hydroxybutene-(3) is used as the initial material.

3. A process as claimed in claim 1, wherein phosgene is used as the halogenation agent and dimethyl formamide is used as the N,N-dialkyl substituted amide.

4. A process as claimed in claim 2, wherein phosgene is used as the halogenation agent and dimethyl formamide is used as the N,N-dialkyl substituted amide.

5. A process as claimed in claim 1, wherein the reaction is carried out in a solvent.

6. A process as claimed in claim 5, wherein the solvent is a hydrocarbon.

7. A process for production of derivatives of omega-hydroxytiglaldehyde which comprises halogenating a member selected from the group consisting of 2-formyl-2-hydroxybutene-(3), di-lower alkyl acetals thereof and lower fatty acid acylates thereof with a molar excess of a halogenating agent selected from the group consisting of thionyl chloride, thionyl bromide and phosgene at a temperature in the range of about $-30°$ C. to about 120° C. in the presence of at least 0.01 mol, with reference to said member, of a member selected from the group consisting of N,N-dialkyl substituted amides of low molecular weight fatty acids, N-lower alkyl pyrrolidones, and N-lower alkyl caprolactams to produce a member selected from the group consisting of 4-chloro-2-formylbutene-(2), the corresponding di-lower alkyl acetal thereof and the corresponding lower fatty acid acylate thereof.

References Cited
UNITED STATES PATENTS 2,274,611 2/1942 Hurd _____ 260—654
2,783,258 2/1957 Celmer _____ 260—654

LEON ZITVER, Primary Examiner.

J. J. SETELIK, R. LILES, Assistant Examiners.

UNITED STATES PATENT OFFICE
CERTIFICATE OF CORRECTION

Patent No. 3,347,930            October 17, 1967

Herwig Freyschlag et al.

It is hereby certified that error appears in the above numbered patent requiring correction and that the said Letters Patent should read as corrected below.

Column 2, line 58, for "remommended" read -- recommended --; column 4, lines 30 and 31, for "pyrrolidones" read -- n-alkyl pyrrolidones --.

Signed and sealed this 4th day of February 1969.

(SEAL)
Attest:

Edward M. Fletcher, Jr.            EDWARD J. BRENNER

Attesting Officer            Commissioner of Patents